United States Patent

[11] 3,588,900

[72] Inventor Gaston Raoul Salmet
 15 Avenue des Ailantes, Saint-Maur, Val
 De Marne, France
[21] Appl. No. 787,344
[22] Filed Dec. 27, 1968
[45] Patented June 28, 1971
[32] Priority Jan. 2, 1968
[33] France
[31] 134,547

[54] RADIO COMPASS AND MEANS FOR CONTROLLING ITS MOTOR
 12 Claims, 5 Drawing Figs.
[52] U.S. Cl. .................................................. 343/117, 343/120
[51] Int. Cl. .................................................. G01s 3/42
[50] Field of Search ...................................... 343/117 (O), 120

[56] References Cited
 UNITED STATES PATENTS
 2,463,286  3/1949  Kolster ........................ 343/120
 2,513,849  7/1950  De France ................... 343/120
 3,435,455  3/1969  Yello ............................ 343/12

Primary Examiner—Rodney D. Bennett, Jr.
Assistant Examiner—Richard E. Berger
Attorney—Karl F. Ross ABSTRACT: A radio compass has two crossed loops with outputs normally blocked by series capacitances and diodes these loops being made alternately operative by energizatio in phase opposition with a low frequency square wave. Th combined output currents generated in the loops are fed to phase discriminator receiving the same square wave as reference oscillation, thereby giving rise to a control voltag applied to a reversible drive motor for the rotatable loop ar ray. Signals picked up by a juxtaposed omnidirectional anten na may be intermittently superimposed upon the loop outpu by a manual switch or by a train of monitoring pulses to pro vide an unambiguous indication of the origin of the receive radiation, in the latter case the monitoring pulses may bloc the input circuit to the motor during operation of a balance zero indicator responsive to the combined output signals.

3,588,900

INVENTOR
GASTON RAOUL SALMET

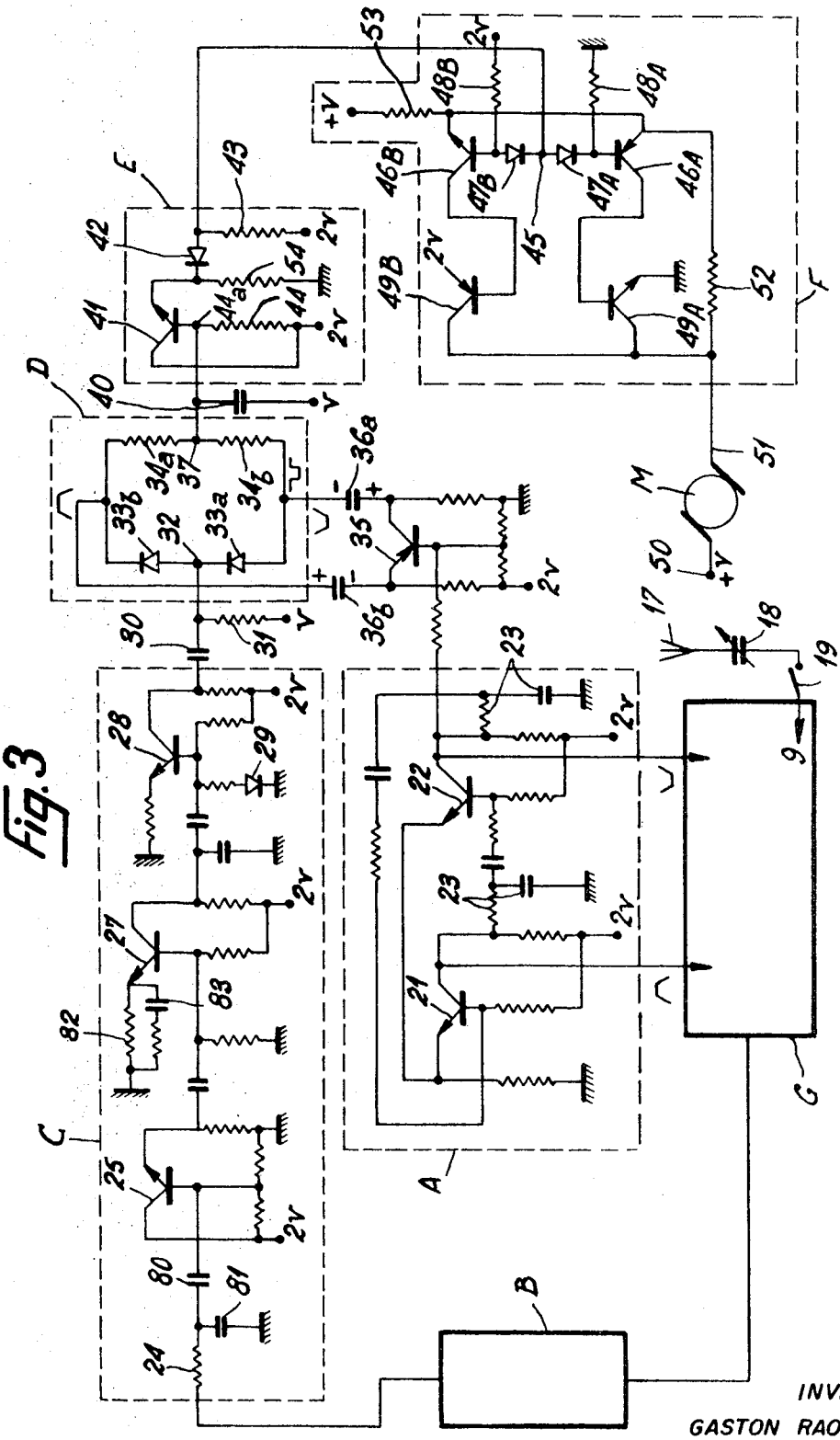

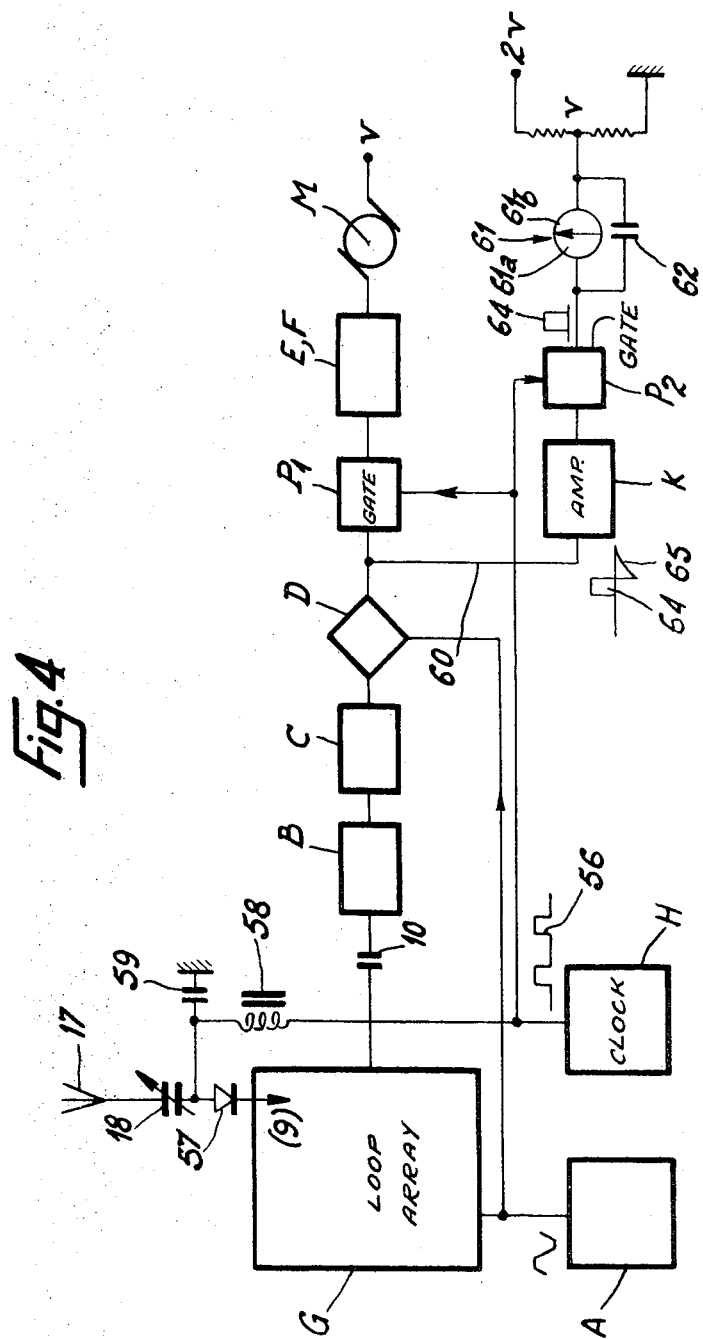

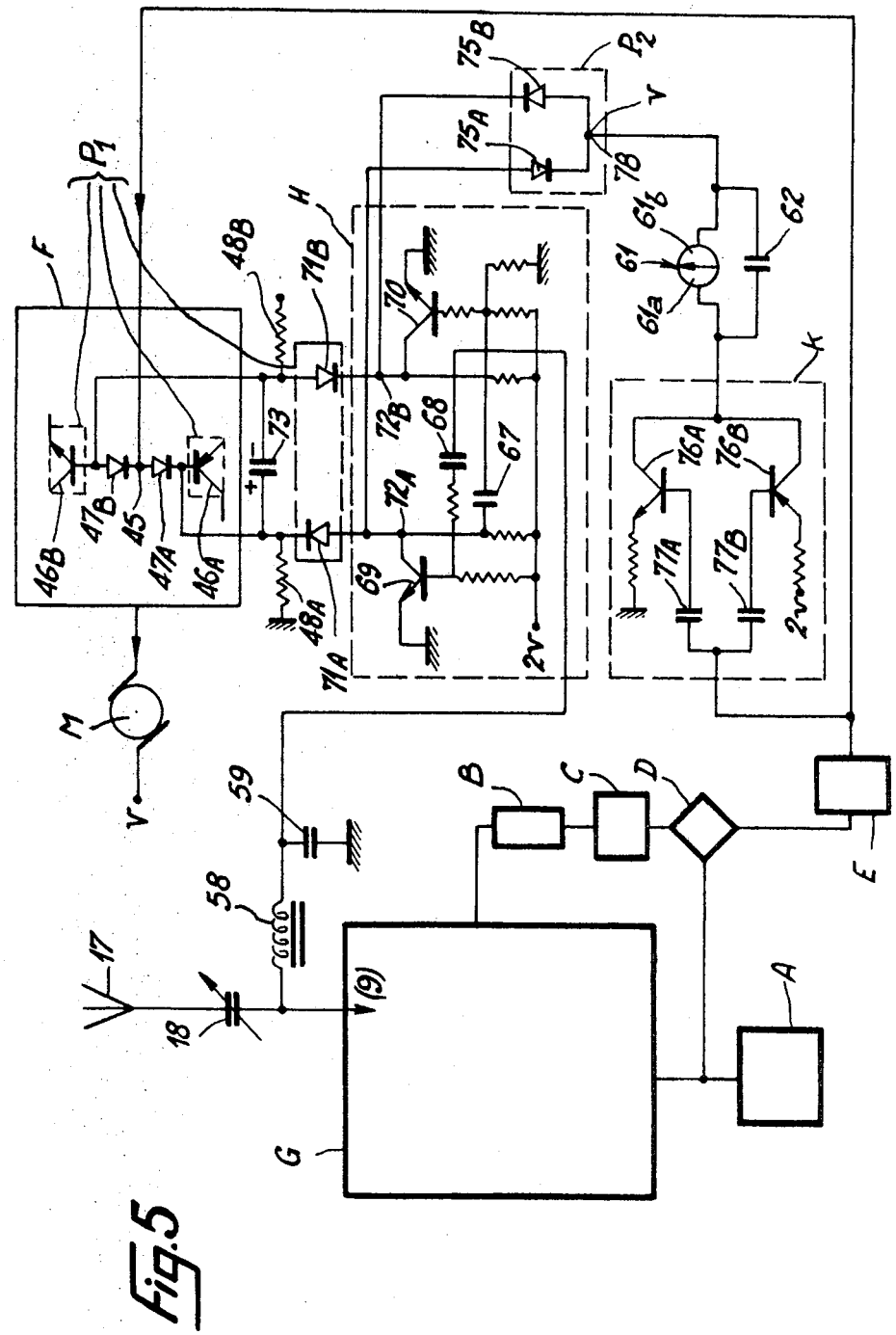

RADIO COMPASS AND MEANS FOR CONTROLLING ITS MOTOR

The bearing of a radio transmission station can, of course, be found by means of a receiver having a loop rotatable about a vertical axis, reception being a maximum when the loop plane is directed towards the station and disappearing when that plane is perpendicular to such direction. This procedure, known as radio direction finding, does not show the "sense" or side of the direction thus found, and for this purpose it is known to use a sensing facility comprising an antenna which can be connected to the receiver in parallel with the loop by way of a capacitor and a pushbutton. After the station bearing angle, corresponding to null reception, has first been identified, the loop is turned through 90° for maximum reception and the pushbutton is operated. The high frequency voltage introduced by the sensing antenna is, because of the compacitative connection, either cophasal with or in phase opposition to the loop voltage, and so the received signal is strengthened or weakened according as the station is on one side or the other of the loop.

A simple loop cannot be used to provide an automatic radio-direction-finding system giving the bearing of a transmission station without manual operation, for from a singular loop position, defining orientation of a station either by maximum volume or by null reception, received signal strength varies similarly for a similar angle of rotation to either side from such position. In other words, this information cannot be used to give a sense indication suitable for automatically turning the loop in the desired direction.

A known radio compass for resolving this difficulty comprises at the input of a conventional receiver a loop which is rotated by a controlled motor and whose connection to the receiver input is reversed periodically by a low frequency voltage (e.g. every hundredth of a second, and an ordinary antenna connected to the receiver by a circuit arrangement producing a 90/2 phase shift of the high frequency voltage. When the loop plane is dead perpendicular to the transmitter direction, zero high frequency energy is collected by the frame and so the high frequency level at the receiver input is the level of the sense-antenna input, having the same for the two alternate connections of the loop. When, however, the frame shifts from this position, a voltage is produced in it at each switching and varies the input voltage one way or the other. A phase-discriminating circuit arrangement using as phase reference the loop-switching voltage can be used to produce a voltage which is the resultant of the voltages in the two loop-switching positions, and this resultant voltage can be used to control a loop-driving motor adapted to rotate the frame into an equilibrium position in which the frame plane is perpendicular to the station direction.

There are two equilibrium positions but one of them in unstable, thus helping ascertainment of the station bearing.

This known construction has difficulties which make it complicated and costly. The loop and the antenna are wave collectors whose collection and transmission of waves in dependence upon frequency differ fundamentally. It is therefore very difficult to maintain a constant relationship between the two high frequency energy levels collected by the loop and the antenna, respectively, over a wide frequency range; also, the relative positions of the loop and of the antenna must be carefully selected. The phase relationship between the antenna-collected voltage and the loop-collected voltage must be very accurate too, and this is a requirement difficult to comply with over a wide frequency range.

My present invention obviates these disadvantages. The invention relates to a radio compass whose behavior is substantially independent of the frequency of the monitored transmission station and which can use a conventional commercial radio receiver as an intermediate element, the sensitivity, stability and usable frequency range being those of such receiver. The invention also makes it possible to use stations not specially designed for guidance—i.e., conventional amplitude-modulated radio broadcasting stations.

According to the invention, a radio compass has a wave collector periodically switched to a receiver input by an auxiliary low frequency voltage and rotated around a vertical shaft by a motor controlled in accordance with the direction of a transmitting station by comparison of the phase of the received signals with the phase of the auxiliary voltage, the wave collector comprising two identical loops which are relatively offset at a constant angle on the vertical shaft and which are switched alternately by the auxiliary voltage to the receiver input, the receiver output voltages being alternately phase compared with the auxiliary voltage to produce a voltage controlling rotation of the motor, bringing the reception levels of both loops to the same value.

Preferably, the two loops are secured to the shaft at right angles to each other, for maximum sensitivity.

When the reception levels are the same for both loops, the transmitter is bound to be in one of the two planes bisecting the planes of the two frames at right angles. As will be shown, however, one of these two bisectors corresponds to two unstable equilibrium positions in which the radio compass substantially cannot stop, but there are in fact two possible equilibrium positions 180° apart and corresponding to the other bisector, and a choice must be made between these two latter positions. This choice can be made, similarly to what is done in manual radio direction finding, with an auxiliary sense antenna, and the radio compass comprises two scales displaced by 180°.

According to a preferred feature of the invention, the signal received by the auxiliary antenna is mixed with the signal from the two loops and after phase discrimination is briefly applied to a balanced indicating instrument giving symmetrical deflections, the direction of instrument deflection indicating which of the two radio-compass scales gives the correct reading.

Advantageously, therefore, the two mutually offset scales are painted in readily distinguishable colors, and by its deflection direction the indicating instrument shows which of the two colors should be used.

In a simple embodiment of the invention, the indicating instrument is the radio compass itself whose indicating pointer is double-headed and provided at each end, on opposite sides of a radial plane, with the two scale colors.

Consequently, once the system is in an equilibrium position, the antenna signal is applied to the receiver input by operation of a pushbutton, and the unbalance introduced by the sense-antenna signal makes the pointer rotate in the direction of the scale color which should be used.

In a more complex embodiment, an auxiliary clock system delivers a recurrent sequence of short pulses which are used to feed the sense-antenna signal into the receiver, cut off the circuit energizing the control motor, and bypass the receiver voltage to an auxiliary system comprising a separate symmetrically deflecting indicator connected in parallel with a capacitor for integrating the received signals. Since the time constant of the charging circuit for the latter capacitor is a little shorter than the clock-pulse repetition period, the indicator pointer deflects steadily to one side but always oscillates. Since the indicator dial is marked on one side with the color of one of the scales and on the other side with the color of the other scale, the user's attention is always drawn to the correct side to use for reading.

The radio compass according to the invention, with or without a sensing system, has the following advantages over known radio-compass constructions:

Its accuracy depends substantially only on indentity of the two loops which make up its rotating equipment;

It can be associated with any receiver and, since the switchable collecting devices are identical, the usable frequency bands occupy the entire frequency range which the receiver coupled to the collecting elements can receive;

sensitivity is substantially constant over a very wide range of high frequencies, since the receiver's own automatic gain-control system also has a controlling action on the gain of the control loop. The low frequency level variation can therefore be less than 3 db. for a 60-db. input signal variation;

the physical arrangement of the rotating loops is not critical, and the sensing antenna, which has only an auxiliary function in sensing, can be positioned anywhere;

bearings can be taken on modulated transmitters, more particularly broadcasting stations, as the modulation is really a low frequency voltage unrelated to the loop-switching voltage and therefore not affecting the DC voltage output of the phase discriminator;

as will be realized hereinafter, the device is simple and easy to construct.

Because of the large number of transmitting stations and of their very wide geographical distribution, the radio compass according to the invention is very suitable for homing in on an appropriately chosen station.

The invention also relates to a system for controlling a reversible motor in accordance with the magnitude, relative to a particular mean value, of the voltage applied to the motor, to produce operation of the motor in either direction and to brake the motor when, owing to movement of the motor-driven load, the motor rapidly approaches a required equilibrium position so that the applied voltage approaches the predetermined mean value.

According to the invention, the motor, whose armature field is independent of field current, has one of its armature terminals connected to a voltage source of the predetermined mean value, the other motor-armature terminal being connected to the interconnected outputs of two symmetrical transistorized amplifiers having input transistors which are similar but opposite types (PNP and NPN) and whose interconnected bases receive the motor control voltage, the second motor terminal being connected to the input-transistor emitters by a resistive negative-feedback circuit connected to the supply at the mean voltage.

In a system of this kind the negative-feedback circuit is inoperative when the motor runs slowly or is stationary. When, however, the motor runs fast and moves the load rapidly towards the equilibrium position, its reverse emf—i.e., its apparent resistance—becomes appreciable, and so the emitter voltage of the input transistors alters, with the result that the conductivity of whichever transistor happens to be conductive diminishes, the conductivity of the transistors possible changing over.

Consequently, a deceleration and possibly a braking torque can be applied to the motor, so that the load does not oscillate around the equilibrium position.

For taking account of the base-emitter threshold voltage of the input transistors, their bases can be prebiased by diode circuits, the diodes being made of the same semiconductor material as the input transistors.

The following description, taken together with the accompanying exemplary nonlimitative drawing, will show clearly how the invention can be carried into effect.

In the drawing:

FIG. 3 is a diagram showing details of a practical embodiment of a radio compass as shown in FIG. 1;

FIG. 4 is an overall diagram of a radio compass according to the invention with automatic sensing; and FIG. 5 is a diagram giving details of an embodiment of the radio compass shown in FIG. 4.

Figure 1:
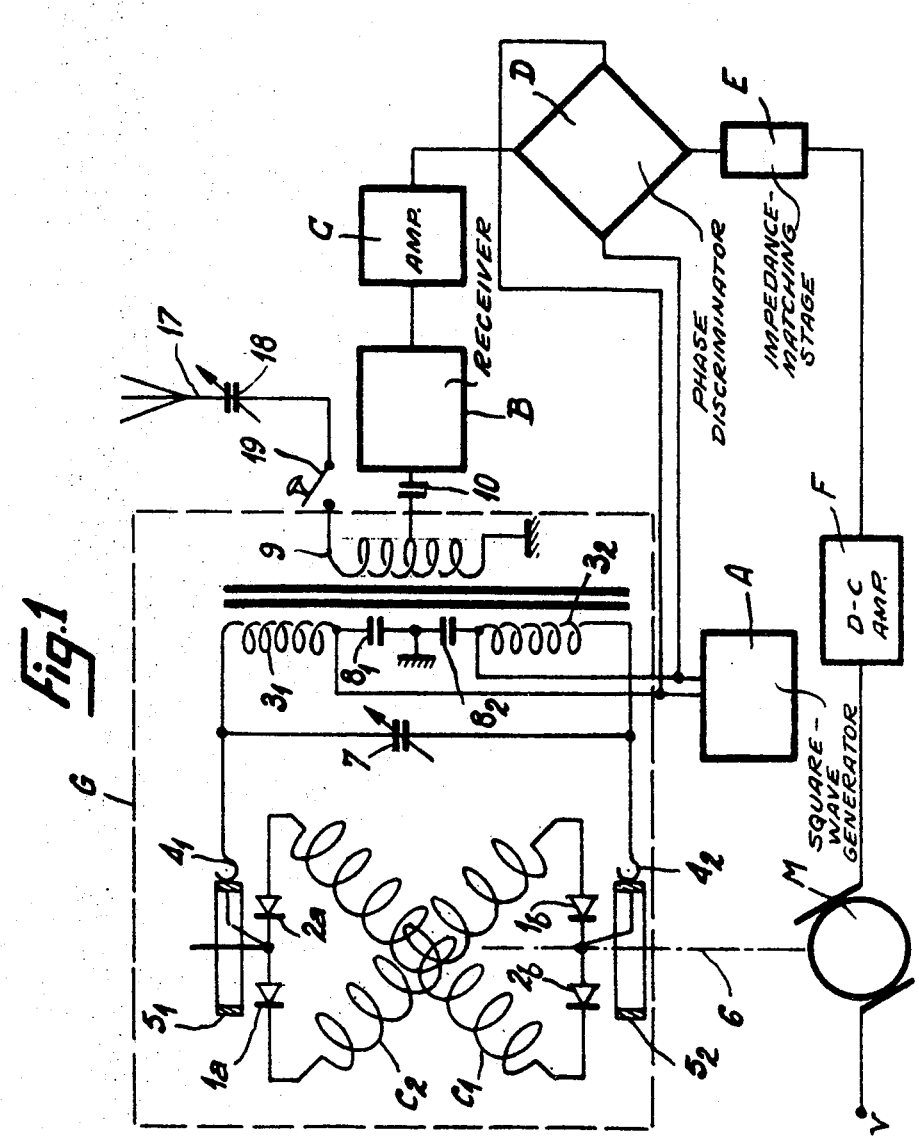
FIG. 1 is an overall diagram of a radio compass according to the invention with manual sensing.

The radio compass shown diagrammatically at G in FIG. 1 comprises two identical loops $C_1$, $C_2$ which cross at right angles and are mounted on a vertical shaft 6 (shown in diagrammatic form) driven through a reducer (not shown) be a DC motor M having either a separately excited field or a permanent-magnet field, i.e., a motor which reverses upon a change in the direction of current flow through its armature. The loops $C_1$, $C_2$ are alternately energized by a square low frequency voltage output of a generator A through diode pairs $1a$, $1b$ for loop $C_1$ and $2a$, $2b$ for loop $C_2$. The current reaches the diodes through primary windings $3_1$, $3_2$ and brushes $4_1$, $4_2$ which slips rings $5_1$, $5_2$ on shaft 6. Also provided are a tuning capacitor 7 and decoupling capacitors $8_1$, $8_2$.

The high frequency voltage alternately collected by the two loops is picked up from transformer secondary winding 9 and transmitted via a coupling capacitor 10 to the input of a conventional sound radio receiver B which determines each wavelength used for the radio compass and whose sensitivity and selectivity determine the quality of radio-compass operation. Receiver B to works into an amplifier and impedance matcher C which feeds a phase discriminator D where the amplified output voltage of receiver B is compared with the symmetrical square wave of generator A. In the discriminator D the voltage alternately supplied by each of the two loops is in phase or in antiphase with the positive or negative square-wave voltage impressed upon the corresponding loop.

The discriminator therefore delivers the difference between the peak voltages which represent the difference between the field intensities alternately picked up by the loops $C_1$, $C_2$, and this differential voltage goes, through an impedance matcher E and DC amplifier F, to one of the terminals of the motor M whose other terminal is connected to a source of mean voltage $V$. (on the assumption that the limiting or extreme voltages are $2v$. and o respectively) for control of the motor by the differential voltage with the aim, as will be described hereinafter, of bringing one of the bisector planes of the two crossed loops into the direction of the signal source.

In plan view (FIG. 2), the two loops $C_1$, $C_2$ have vertical planes which intersect perpendicularly on the axis $o$ of shaft 6; the loops are rigidly connected with a circular disc or plate 12 having a double pointer 13 in one of the two planes bisecting the planes of the loops. Disc 12 is movable in a stationary circular ring 14 having all around its periphery two concentric scales 15, 16 which both read from 0° to 360° but which are offset from one another by 180°. For instance, scale 15 can be marked blue and scale 16 red. The fixed diametrical line 0°; —180° (or 180°—0°) can extend along the axis of the craft in which the radio compass is mounted. The scales could of course be marked on the disc 12 and the ring 14 have just the lubber's lines.

Figure 2:
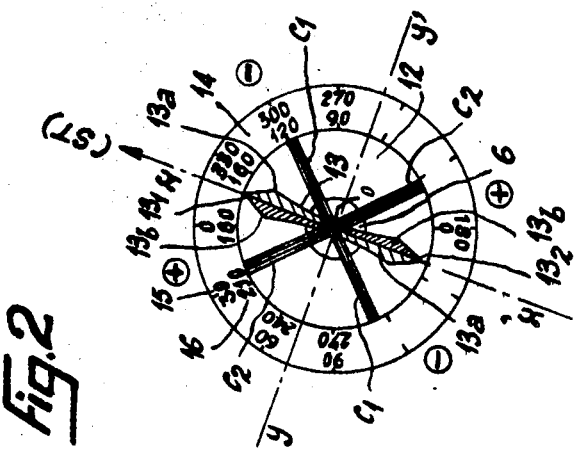
FIG. 2 is a plan view of the two loops of such radio compass.

It will be assumed, as is shown in FIG. 2, that the double pointer 13 is oriented exactly on a radio transmission station ST, so that the two loops $C_1$, $C_2$ are symmetrical with reference to the direction of the station ST—i.e., the axis $x$-—$x'$. The two loops, which are alternately operative, are energized by equal fields $C_1$, $C_2$, so that the difference $\Delta$ between them is zero. If the loops are shifted slightly clockwise from this position the loop $c_2$ is subjected to a stronger field than the loop $C_1$, since loop $c_2$ approaches the direction of the station ST whereas loop $c_1$ moves away from such direction, so that the difference $\Delta$ upon such a shift becomes negative. A shift in the opposite direction, of course, produces a positive $\Delta$and so the approach to positions at which the difference $\Delta$ is zero is by way of positive values in the quadrants $xoy$ and $x'oy'$and of negative values in the quadrants $x'oy$ and $xoy'$.

The discriminator D materializes the difference $\Delta$ as a voltage which can be considered as either positive or negative since, as will be shown hereinafter, such voltage, depending upon the value of $\Delta$is above or below the mean voltage $v$.

If the motor M drives the loops clockwise when $\Delta$ corresponds to a positive voltage (and counterclock in the opposite case), then it will be immediately apparent from FIG. 2 that, because the motor M is controlled by the voltage output of the discriminator D, the moving loop system displaced to either side from the position of FIG. 2 towards this position which is therefore a stable equilibrium position. On the other hand, if the double pointer 13 is made to coincide one way or the other with the axis $yoy'$, where the difference $\Delta$ is also zero provided that such axis is oriented in the direction of the station ST, then, as soon as the rotating loop system is moved off that axis, the motor operates to move it away still more, which is characteristic of an unstable equilibrium position. In practice, therefore, the rotating system driven by the motor M cannot stop in either of the two positions in which the axis $yoy'$ is oriented on the station ST and is bound to be brought to one of the two positions in which the double pointer 13 coincides with the direction of the station ST, for when shifted away from this direction the associate motor moving system is restored to such a direction by the control.

The doubt about the true position of the station ST—i.e., whether it lies towards $x$ or towards $x'$—can be resolved, e.g., by means of a small auxiliary compass. Another way is to use an auxiliary antenna, a small proportion of the field collected thereby being applied, via a capacitor 18 and a pushbutton switch 19, to the free end of the secondary winding 9 of the system G. The field collected by an omnidirectional antenna and undergoing a 90° phase shift due to a capacitor is cophasal with or in phase opposition to the field collected by a loop. Consequently, if button 19 is operated when the moving system has reached an equilibrium position, the energy collected by the antenna 17 adds to the energy collected by one of the loops and is subtracted from the energy collected by the other, so that, via the discriminator, an out-of-balance condition occurs which tends to make the rotating system rotate in one direction or the other. The sense of rotation in which the rotating system turns when button 19 is operated varies according to whether the station or source ST lies in the direction $x$ or in the direction $x'$ and therefore reveals the location of the source. To make use of this indication, each of the two apexes $13_1$, $13_2$ of the double pointer 13 is divided by a radial line into two parts 13a, 13b colored the same as the scales 15, 16, respectively. Consequently, the side to which the pointer 13 deflects determines by its color which of the two scales, and therefore which of the two apexes $13_1$, $13_2$, gives a true indication of the direction of station ST and shows its bearing. FIG. 3 shows a practical embodiment giving details of the sections or portions A, C, D, E, F shown diagrammatically in FIG. 1. In FIG. 3 the mean voltage is $+v$., the maximum energizing voltage is $2v$. and the minimum voltage ($0$) is the ground potential.

The low frequency generator A is a multivibrator comprising transistors 21, 22 with their collectors and base capacitively and symmetrically cross-connected. Each cross-connection comprises a delay network 23 of the resistance-capacitance type for slowing down changes of multivibrator states so as to increase the duration of the switchover periods at the leading and trailing edges of the loop; switching square wave. Since the square-voltage repetition rate is low, for instance, 50 to 100 Hz., its pulses can have sloping flanks of low frequency harmonics content so as not to disturb the operation of receiver B.

The input of amplifier C comprises a capacitor 80 associated with a resistance 24 so that very low frequencies, but not DC can reach the amplifier proper; a capacitor 81 bypasses the higher harmonics of the low switching frequency to ground. Modulated-transmission stations can therefore be used because the output frequencies of amplifier B, lying in the audio range, do not cause disturbances in the subsequent part of the system.

Amplifier C comprises a cathode-follower stage represented by an emitter-follower-connected transistor 25 for matching the impedance between the output of receiver B and the remainder of the system.

The cathode-follower stage is followed by amplifying stages 27, 28. Stage 27 comprises in its emitter circuit a resistance 82 providing for DC amplification a negative feedback which limits and stabilizes amplification gain and determines its value. A capacitor 83 decouples the transistor for AC. Stage 28 comprises a diode 29 disposed in a circuit extending from $2v$. to ground voltage for temperature correction.

The only AC component delivered by the system C goes to discriminator D via a coupling capacitor 30, and the DC level of that component is determined by connecting a function 32 in the discriminator input through a resistance 31 to the mean voltage $v$.

The discriminator D comprises two symmetrical arms each having a respective diode 33a, 33b and a respective load resistance 34a, 34b. The phase reference of generator A is made completely symmetrical in regard to the mean voltage $v$. by the symmetrical cascade connection of a transistor 35 whose base receives one of the voltages from generator A. The symmetrical emitter and collector voltages of transistor 35 go to the two arms of discriminator D via capacitors 36a, 36b. Since the voltages supplied to discriminator input 32 are exactly cophasal with or in phase opposition to the frame-switching voltage, the peak value (between $v/2$ and $3v/2$) of the amplified voltage delivered by the amplifier C is collected at discriminator output 37.

A capacitor 40 whose outer plate is connected to the mean voltage $v$. shunts out the AC component at the discriminator output and protects the discriminator output voltage from the effects of variations in supply voltage, when the supply is a low-power one (batteries), resulting from rotation of the motor M.

The discriminator output voltage goes to impedance-matching stage E which comprises an emitter-follower-connected transistor 41 and a diode 42. The magnitude of a biasing resistance 44 in the base load of the transistor is such that in the base-emitter circuit of transistor 41 the base voltage at 44a is equal to the mean voltage $v$. At equilibrium, therefore, there is no output from the discriminator. Also, in the circuit comprising the resistance 43, diode 42 and a collector resistance 54, direct current always passes through the diode 42, and so the voltage thereacross is subtracted from the base-emitter voltage drop of transistor 41 and therefore—since the constituent material of the diode 42 and transistor 41 are identical—cancels the last-mentioned voltage drop. Because of the considerable curvature at the origin of the characteristic of diode 42, its resistance varies little for relatively large output variations and so the diode 42 provides a constant compensation for the base-emitter voltage drop. The diode 42 also compensates the variation of transistor characteristics with temperature. As will be seen hereinafter, a similar circuit arrangement is used with serially connected diodes 47B, 47A for threshold and temperature compensation of transistors 46B, 46A.

The output of cathode-follower stage E is connected to central input 45 of an amplifier F, input 45 being connected to the two bases of the two transistors 46A, 46B in the two arms of the amplifier. The connecting circuit comprises diodes 47A, 47B and biasing resistances 48A, 48B and serves as already explained, to bias the transistors 46A, 46B to obviate the threshold effect of their base-emitter voltage, which is considerable particularly in the case of silicon transistors; the diodes 47A, 47B also provide temperature compensation for the circuit. The transistors 46A, 46B are of opposite types and their collectors are connected to the bases of transistors 49A, 49B, respectively, which are also of opposite types and whose emitters are directly connected to ground and to the voltage $2v$., respectively. The collectors of transistors 49A, 49B are connected in parallel to a first terminal 51 of the motor M, the second terminal 50 thereof being connected to the voltage $v$. Consequently, current flows through the motor M in one direction or the other according to which of the transistors 49A or 49B is conductive.

Starting from motor terminal 51 is a negative-feedback circuit which is connected to the voltage $v$. and which comprises a voltage divider formed by resistances 52, 53, the junction thereof being connected to the emitters of the input transistors 46A, 46B.

When at equilibrium the mean voltage $v$. is applied to input 45, neither of the input transistors 46A, 46B, whose emitters are (on both sides) biased at the voltage $v$. can conduct and the motor M is stationary. If the voltage applied at point 45 is below $v$., the amplifying arm 46A, 48A conducts and the motor rotates in one direction. If the voltage applied at the point 45 is above the voltage $v$., the other amplifying arm conducts and the motor M rotates to the opposite sense.

When the motor does not rotate or rotates slowly (starting or preparation for stopping), its resistance is negligible and there is no alteration in the operation of the amplifier, but when the motor runs rapidly its reverse-emf becomes considerable, with a considerable increase in the apparent resistance of the motor, so that the voltage at terminal 51 shifts towards either zero or 2v., depending upon the direction of motor rotation. A fraction of the latter voltage is applied to the emitters of the transistors 46A, 46B by the voltage divider 52, 53 so that when the voltage input at the point 45 itself approaches the value v. with the rotating system approaching the equilibrium position, the conductivity of whichever input transistor happens to be conductive decreases and may even disappear whereupon the opposite transistor becomes conductive, so that a braking current in the opposite direction is injected into the motor M. The rotating system therefore reaches its equilibrium position without oscillation.

Some continuously operating monitoring means, supplying information on the correct end of the point 13 to be used, may be desirable, particularly for aerial navigation where a transmitting station such as a beacon may be overflown, with the result that the operative end of the pointer 13 alters abruptly.

The diagram shown in FIG. 4 is of use for this purpose and shows a circuit arrangement comprising a clock H delivering a recurrent pulse train 56. Antenna 17 and its variable coupling capacitor 18 are connected to the end of secondary winding 9 by a diode 57 which receives the pulse 56 via an inductance 58 and a capacitor 59. The signal from antenna 17 therefore enters the receivers simultaneously with one or the other of the loop signals for the duration of every pulse 56, since the pulses make the diode 57 conductive. At the output of discriminator D a gate $P_1$ which also receives the pulses 56 prevents any transmission of discriminator output current to the motor M during the presence of any monitoring pulse, thus ensuring that the signal from antenna 17 does not disturb the existing adjustment. The discriminator output current goes via a bypass 60 to a low frequency amplifier K whose output is normally closed by a gate $p_2$ but is unblocked by the monitoring pulses 56.

When a pulse 56 appears, the output of amplifier K goes to a balanced zero indicator 61, such as a galvanometer, which is biased at the voltage v and shunted by an integrating capacitor 62. The two sides 61a, 61b of indicator 61 have no numerical indications but are colored the same as the markings of the scales 15, 16, respectively. In other respects the arrangement is similar to what has been previously described.

To give some idea, the repetition period of the pulses 56 is of the order of a few seconds, for instance, 3 seconds, and the duration of each pulse is a few tenths of a second, thus—corresponding to a few tens of switchings cycles of the frames $C_1$, $C_2$.

Between two pulses 56 the radio compass operates as already described—i.e., the double pointer 13 (which in this case is not of any particular color or color combination takes up the direction of the station to which the complete system, more particularly the receiver B, is tuned. The discriminator D then delivers a voltage almost equal to v. When a pulse 56 appears, the gate $p_1$ ensures that the pulselike disturbance 64 introduced by brief operation of the antenna 17 does not reach the motor M. However, because of the unblocking of the gate $P_2$, pulse 64 passes to instrument 61 through amplifier K. Because of shunt effects, as shown, the pulse 64 may have a distorted portion 64 which lasts longer than the pulse 56 of opposite sign to the pulse 64. The gate $P_2$, which is open only for the duration of a pulse 56, gates the pulse 64, which is of similar duration, but blocks the transient 65.

Pulse 64 is then applied to the instrument 61. The integrating capacitor 62, charged by the pulse 64, maintains galvanometer deflection beyond the duration of the pulse 56, preferably (by an appropriate choice of value for capacitor 62) as to persist in part until the arrival of a fresh pulse 56. The galvanometer pointer therefore always remains on whichever colored side 61a or 61b it should indicate, oscillating on such side so as to attract attention.

FIG. 5 illustrates details of the system diagrammatically shown in FIG. 4. The clock H is a multivibrator which is considerably unbalanced, inter alia by the value of capacitors 67, 68 in the feedback connections between transistors 69, 70, capacitor 67 being e.g. 10 times larger than capacitor 68. Consequently, short pulses 56 separated by long spaces are produced. The multivibrator outputs 72A, 72B (collectors of transistors 69, 70) are connected to the biasing circuits 47A, 48A and 47B, 48B of transistors 46A, 46B by way of diodes 71A, 71B respectively connected in backing relationship with diodes 47A, 47B. When transistor 69 is conductive and transistor 70 is cut off (during the interval between 2 pulses 56), the voltage at output 72A is zero and at output 72B is 2 v., and so diodes 71A, 71B cannot conduct and amplifier F operates as hereinbefore described. When the polarities of the outputs 72A, 72B are reversed upon the transmission of a pulse 56, the two diodes 71A, 71B conduct, and so a high positive potential is applied to the base of transistor 46A and a very low potential is applied to the base of transistor 46B. Consequently, neither of these transistors can conduct and so motor M is not energized. The diodes 71A, 71B and the transistors 46A, 46B therefore perform the function of gate $P_1$ described above.

Also, a capacitor 73 is charged, so that by discharging after the pulse 56 it briefly prolongs the nonconductive state associated with the pulse 56, so that the voltage of discriminator D can resume its normal value before being reapplied to the control system.

The voltage at the outputs 72A—72B is also applied to a pair of parallel diodes 75A, 75B, respectively, which form the gate $P_2$ and which are in parallel with the diodes 71A, 71B respectively—so that, like the latter, they cannot conduct in the interval between the pulses 56 of the multivibrator H. The input of the very-low-frequency symmetrical amplifier K is connected to the control circuit between the networks E and F (see also FIG. 3). Amplifier K has two transistors 76A, 76B which are of opposite types and are connected as emitter followers. Pulse 64 reaches the bases of transistors 76A, 76B through identical parallel capacitors 77A, 77B. When a pulse 56 appears, the two diodes 75A, 75B become conductive and the potential at 78 becomes v. The pulse 64 is applied to the two transistors 76A, 76B but because of its sign (its level relative to the voltage v. can pass through only one of them.

As already stated, the galvanometer 61 shifts to one or the other directions according to whether the pulse is greater or smaller than the voltage v.

When the voltage disturbance caused by the antenna 16 is very small, the transistor bases can be resistance-and-diode-biased as described with reference to the transistors 46A and 46B or 41, so as to reduce their conduction threshold. Another advantage of this feature is to provide temperature correction.

The embodiments hereinbefore described can of course be modified, as by the substitution of equivalent technical means, without for that reason departing from the scope of this invention as defined in the appended claims.

I claim:

1. A radio compass comprising a pair of crossed loops for receiving incoming high frequency electromagnetic radiation; switching means connected to said loops for making same alternately effective to deliver a signal current proportional to the radiant energy received thereby, said switching means including a generator of a low frequency oscillation applied in phase opposition to said loops; output means coupled to said loops for differentially combining the signal currents thereof; phase-discriminating means connected to receive a reference wave in the rhythm of said low frequency oscillation from said generator and to receive the differentially combined signal currents from said output means for deriving therefrom a control voltage varying in magnitude and sign with the relative orientation of said loops and the direction of incidence of said radiation; reversible drive means connected to said phase-discriminating means for rotating said loops about a common axis in response to said control voltage into a null position; and position-indicating means coupled with said loops.

2. A radio compass as defined in claim 1 wherein said loops are provided with series capacitances and diodes suppressing said signal currents during respective half-cycles of said low frequency oscillation applied thereto.

3. A radio compass as defined in claim 2 wherein said output means comprises transformer means having a pair of capacitively separated primary windings respectively connected in series with said loop.

4. A radio compass as defined in claim 1, further comprising omnidirectional antenna means responsive to said radiation and intermittently operable monitoring means for superimposing an out-of-phase signal from said antenna means upon said combined signal currents to supplement the information of said indicator means for unambiguous ascertainment of said direction of incidence.

5. A radio compass as defined in claim 4 wherein said monitoring means comprises a manually operable switch inserted between said antenna means and said output means.

6. A radio compass as defined in claim 4 wherein said monitoring means comprises a source of periodically recurring clock pulses and gate means triggerable by said clock pulses in said output means.

7. A radio compass as defined in claim 6, further comprising an auxiliary indicator responsive to the combination of said out-of-phase signal with said signal currents, said auxiliary indicator being provided with integrating means for bridging the intervals between successive clock pulses, said output means forming an energizing circuit leading to said drive means and a branch circuit leading to said auxiliary indicator, said gate means including a normally open first gate in said energizing circuit blockable by said clock pulses and a normally closed second gate in said branch circuit unblockable by said clock pulses.

8. A radio compass as defined in claim 6 wherein said source of clock pulses is an asymmetrical multivibrator.

9. A radio compass as defined in claim 4 wherein said indicator means comprises a double-headed pointer and a pair of distinctively colored scales cooperating therewith, each end of said pointer bearing on opposite sides the colors of the respective scales to be read upon deflection of the pointer to either side from said null position.

10. A radio compass as defined in claim 1, further comprising a balancing network interposed between said generator and said phase-discriminating means.

11. A radio compass as defined in claim 1, further comprising an impedance-matching stage between said phase-discriminating means and said drive means, said stage including at least one emitter-follower transistor with a diode connected in its emitter-base circuit for generating a voltage drop compensating the base-emitter voltage.

12. A radio compass as defined in claim 1 wherein said generator is a balanced multivibrator provided with feedback means for effecting a gradual switchover between its operating stages.